Nov. 21, 1939.  C. J. DUNZWEILER  2,180,463
STORAGE BATTERY
Filed July 29, 1936  2 Sheets-Sheet 1

INVENTOR.
CARL J. DUNZWEILER
BY
Kwis, Hudson & Kent
ATTORNEYS

INVENTOR.
CARL J. DUNZWEILER
BY Kwis, Hudson & Kent
ATTORNEYS.

Patented Nov. 21, 1939

2,180,463

UNITED STATES PATENT OFFICE 2,180,463

STORAGE BATTERY

Carl J. Dunzweiler, Cleveland, Ohio, assignor to Willard Storage Battery Company, Cleveland, Ohio, a corporation of West Virginia Application July 29, 1936, Serial No. 93,212

3 Claims. (Cl. 136—134)

This invention relates to storage batteries and, more particularly, to storage batteries of the multiple cell type having submerged or concealed intercell connectors.

Various types of construction have been proposed for storage batteries to provide for submerged or concealed intercell connectors and many of such proposed constructions have been subject to the disadvantage that an acid-tight seal has not been obtainable at the intercell connection. The leakage of acid at this point is highly undesirable because of the corrosion and other harmful results flowing therefrom. It may therefore be said that, as its principal object, the present invention is directed to elimination of acid leakage and the provision of an improved intercell connector which is, in this and other respects, superior to the intercell connectors heretofore proposed.

Another object of the present invention is to provide a multiple cell storage battery of the type having concealed or submerged intercell connectors wherein provision is made for an increased body of sealing compound and a more satisfactory sealing arrangement.

Still another object of my invention is to provide an improved storage battery of the type mentioned which, by reason of my novel arrangement for the intercell connections, has a desired regular and trim appearance.

A further object of the present invention is to provide an improved multiple cell storage battery having novel means for supporting the cell covers.

The invention may be further briefly summarized as consisting in certain novel combinations and arrangements of parts hereinafter described and more particularly set out in the appended claims.

In the accompanying sheets of drawings.

In the accompanying drawings to which more detailed reference will presently be made, I have shown a multiple cell storage battery of the type having submerged or concealed intercell connectors and, as will be explained more fully hereinafter, I have illustrated a novel cover supporting means and novel forms of intercell connections which may be embodied in such a battery. Before proceeding with such more detailed description it should be understood, however, that my invention is not necessarily confined to the particular form of battery illustrated nor to the particular forms of construction to which detailed reference is made herein in disclosing the novel features.

Figure 1:
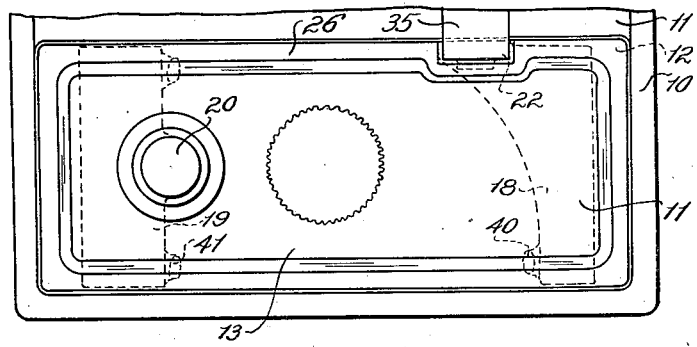
Fig. 1 is a plan view showing one cell of a multiple cell storage battery embodying my invention.
Figure 2:
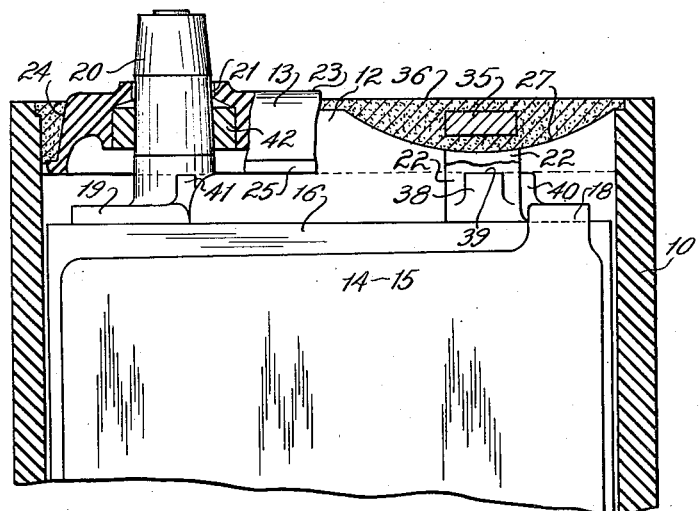
Fig. 2 is an elevation showing the cell with parts thereof in section.

In Figs. 1 and 2 of the drawings I show a storage battery having a container 10 provided with a plurality of compartments which form battery cells 11. The adjacent cells are separated by a fluid-tight intercell partition 12 which extends upwardly to a point near the top of the container. Each of the cells 11 is provided with an upwardly dished individual cover 13 which provides a closure for the top of the cell compartment. Each cell also contains the usual battery elements such as positive and negative plates 14, 15, separators 16 and a quantity of acid or electrolyte.

As is usual in storage batteries the plates of one group, for example the positive plates, are connected at their tops by a strap 18 and the plates of the other group, that is the negative plates, are connected at their tops by a strap 19. The strap 19 of the end cells of the battery may carry a main terminal post 20 which extends upwardly through an opening 21 of the cover, and the straps 18 of the end and intermediate cells carry connector lugs or posts 22 which extend upwardly immediately adjacent the partition 12 and on opposite sides thereof.

The cell covers 13 are in the form of upwardly dished individual covers, each of which has a generally flat transverse top wall 23 and a depending marginal wall 24. The depending marginal wall may be further provided with a short marginal flange 25 which extends laterally outwardly at the bottom thereof for cooperation with the intercell partitions 12 and the side walls of the container 10. As shown in the drawings, the cell covers 13 extend part way into the compartments, so that the tops of the covers are substantially flush with or extend only slightly above the top of the container. The depending walls of the covers of adjacent cells provide therebetween a groove 26 into which the upper portion of the intercell partition 12 extends.

According to one feature of my invention I provide the upper edge of the cell partition 12 with a notch or recess 27 of arcuate or substantially crescent form, as shown in Fig. 2. This recess is formed in the upper edge of the partition at a point between the posts 22 and accommodates the means which provides the electrical connection between the cell posts. In making the recess 27 of crescent or arcuate shape I find that the forming of an electrical connection between the posts 22 of adjacent cells can be done by a lead burning operation, and that this lead burning operation can be carried out with greater facility than has been possible heretofore by the use of a lead burning form or tool 28 of the type illustrated in Figs. 5 and 6. This crescent or arcuate shape for the recess of the intercell partition also provides a more effective seal and facilitates the introduction of sealing material into the space beneath the intercell connector.

Figure 6:
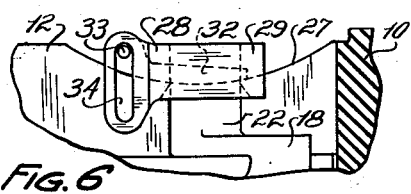
Fig. 6 is a side view of the partition and lead burning form.

The tool 28 represents one satisfactory form of lead burning tool and may comprise a metal frame 29 having a groove 30 across the bottom thereof and an opening 31 with which the groove communicates. The groove is of a width to receive the top of the intercell partition 12 and the opening 31 is of a size and shape to receive the tops of the posts 22, when the form has been applied to the partition. The burning form may also include a tongue-like part 32 which extends across the opening 31 and is received between the posts 22 in overlying relation to the partition 12 when the device has been applied thereto. The tongue 32 may be loosely connected with the frame 29 in various ways, such as by being provided with a pin 33 having projecting ends which are vertically movable in slots 34 of the frame. The lower face of the tongue is of arcuate or convexly curved form to substantially coincide with the curvature of the bottom of the recess 27. The upper face of the tongue is tapered or inclined, as indicated in Fig. 6.

Figure 5:
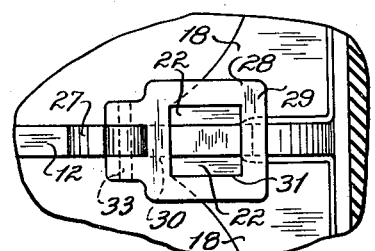
Fig. 5 is a plan view showing an intercell partition with a lead burning form or tool applied thereto.

In forming the lead burned connection 35 between the posts 22 of adjacent cells the tool or device 28 is applied to the top of the partition so as to straddle the same, with the post 22 extending upwardly into the opening 31 on opposite sides of the tongue 32. When the tool is in this position, as illustrated in Figs. 5 and 6, the curved lower face of the tongue 32 lies against the curved bottom wall of the partition recess 27. The opening 31 now provides a pocket or recess for containing the molten lead which when cooled forms the intercell connector 35 which electrically joins the posts 22.

After the lead burning operation has been performed the frame 29 is lifted upwardly from the partition, such movement of the frame relative to the tongue 32 being permitted by the pin and slot connection 33, 34 therebetween. After having been lifted above the partition, the frame 29 is moved laterally to withdraw the tongue 32 from beneath the newly formed connector 35. If desired, the frame part 29 of the burning tool may be separable from the tongue part 32 to facilitate removal of the tool after the burning operation. Such separation may be provided for either by having the pin 33 removable or by leaving open the lower end of the slots 34.

It will be noted that the withdrawal of the tongue 32 leaves a space or opening beneath the connector and above the arcuate bottom of the recess 27. The provision of this intervening space between the connector and the bottom of the partition recess is desirable and constitutes one of the features of my invention. This space is desirable because it provides for an increased body of sealing compound such that when it is filled both the connector 35 and the upper portions of the posts are completely surrounded by the compound.

Figure 3:
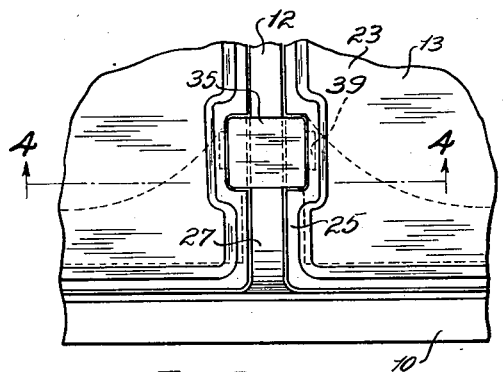
Fig. 3 is a partial plan view showing an intercell connector and adjacent structure before the sealing compound has been applied.
Figure 4:
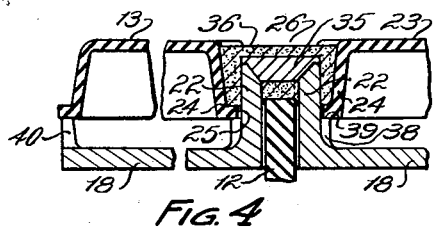
Fig. 4 is a transverse sectional view taken through the intercell connection, as indicated by line 4—4 of Fig. 3, but showing the sealing compound in place.

By referring to Figs. 3 and 4 of the drawings it will be noted that adjacent the posts 22 the depending walls 24 of the cell covers are offset or recessed away from the partition 12 so as to provide the groove 26 with an enlargement at this point. This enlargement of the groove accommodates the intercell connection formed by the posts 22 and the connector 35 and also accommodates an additional body of the sealing material 36 which surrounds the connector and the posts.

After the posts 22 have been electrically connected by the above-mentioned lead burning operation and the tool or form 28 has been removed, the covers 13 are fitted into the tops of the compartments. The sealing compound 36, which may be any suitable plastic, such as pitch or bitumen, may be run into the groove 26 and its enlargement formed by the recessed portions of the depending cover walls 24 and into the arcuate recess 27 of the intercell partition. In this connection it will be noted that the arcuate form provided for the recess 27 facilitates the flow of the sealing compound into the space beneath the connector 35. Sufficient sealing compound is put in the groove 26 so that the top of the compound is substantially flush with or only slightly below the tops of the cell covers 13 and so that the connector 35 will be completely submerged and embedded in the compound.

As another feature of my invention I provide novel means for supporting the cell covers so that they will be carried by the plate groups which are, in turn, carried on bottom rests provided in the container compartments. This novel cover supporting means comprises lugs 38 formed integrally with the posts 22 and projecting therefrom to provide lateral shoulders or abutments 39 which are engaged by the lateral flanges 25 of the covers. In addition to the lugs 38 formed on the posts 22, I may also provide the straps 18 and 19 with lugs 40 and 41 integrally formed thereon adjacent their ends. The latter lugs extend upwardly from the straps 18 and 19 and also provide shoulders or abutments which are engaged by the lower edges of the cover walls. The lugs 40 and 41 are preferably located at the sides of the straps 18 and 19, as shown in Fig. 1, so that they will not be burned off during the usual lead burning operation which is performed to connect these straps with the tops of the plate groups. In some instances the covers for the end cells may be provided with post engaging bushings 42 which tightly grip the terminal posts 20 when the covers are fitted into the compartment openings. The gripping of these bushings on the posts provides a support for the corresponding ends of the covers and when these bushings are provided in the covers the lugs 41 may not be necessary and may be omitted.

Figure 8:
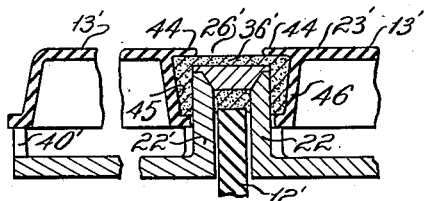
Fig. 8 is a sectional view taken through such intercell connection, as indicated by line 8—8 of Fig. 7.
Figure 7:
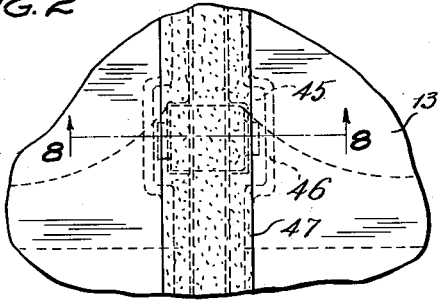
Fig. 7 is a partial plan view showing another arangement of my intercell connection using cell covers of novel form.

In Figs. 7 and 8 of the drawings I have shown another intercell connection of the submerged or concealed type which is similar to the connection just described, but which embodies another feature of my invention. This additional feature consists in the provision of lateral extensions 44 on the cell covers 13'. Each extension 44 is formed as a continuation of the top wall 23' of the cell cover and is substantially flush with the surface of such top wall. The extensions 44 overlie and conceal the spaces 45 formed by the depending cover wall portions 46 being off-set or recessed away from the intercell partition 12'.

The extensions 44 are desirable for the reason that they form lips or flanges overlying the compound 36' adjacent the posts 22 and serve to hold the compound firmly in place around these posts. These extensions are desirable for the further reason that in the finished battery they give the covers 13' the appearance of having straight unbroken edges 47 which are uniformly spaced apart across the top of the battery and provide for an exposed surface or strip of sealing compound of uniform width across the battery.

Figure 9:
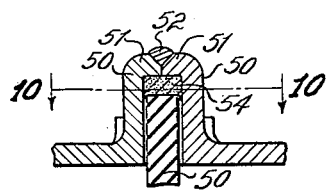
Fig. 9 is a transverse sectional view taken through another intercell connection embodying my invention.
Figure 10:
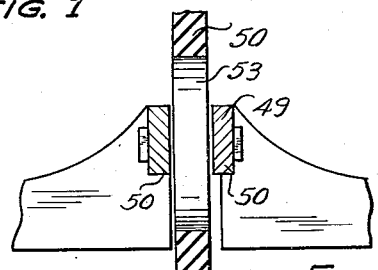
Fig. 10 is a sectional plan view taken on line 10—10 of Fig. 9 but with the sealing compound omitted.

In Figs. 9 and 10 of the drawings I have shown another form of intercell connection which is similar to the forms already described, but wherein the posts 49 which extend upwardly on opposite sides of the intercell partition 50 have lateral extensions 51. These extensions come into substantially meeting relation with each other, and may be electrically connected by a relatively simple lead burning operation to provide a connector 52. The forming of the posts 49 with the lateral extensions 51 facilitates the operation of forming the connector 52 and reduces the amount of lead burning which is required to be performed in producing the connection. It will be understood, of course, that the intercell connection formed by the lateral extensions 51 of the posts and the lead burned connector 52 extend across the partition 50 in an arcuate recess 53 thereof and are sealed by compound 54.

Figure 11:
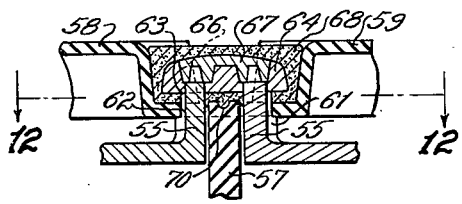
Fig. 11 is a transverse sectional view of another intercell connection embodying my invention.
Figure 12:
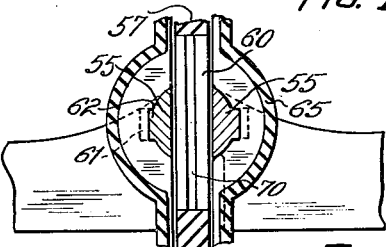
Fig. 12 is a sectional plan view thereof taken on line 12—12 of Fig. 11 but with the sealing compound omitted.

In Figs. 11 and 12 I have shown an intercell connection which embodies a further novel feature of my invention. The connection shown in this instance is formed by posts 55 which extend upwardly on opposite sides of a partition 57. The top of the partition extends into a groove formed between the cell covers 58 and 59 and has an arcuate recess 60 in the top thereof. The posts 55 have integral cover supporting lugs 61 thereon, and in addition, have integral lugs 62 providing lateral shoulders 63 for positioning a preformed link or connector 64. This link may be of round or oval form and may be disposed in the groove enlargement formed by the off-set arcuate portions 65 of the depending cover walls. This connector has openings therein which receive the tops of the posts 55, and also has a recess 66 in which molten lead may be puddled to form a body 67 for integrally uniting the posts and the connector.

The shoulders 63 of the lugs 62 are so located on the posts 65 that when the connector 64 is applied to the posts it will be positioned in spaced relation above the bottom of the arcuate recess 60 of the partition. This space corresponds with the space provided under the connector 35 of Fig. 4, by the withdrawal of the tongue 32 of the lead burning form, and when the compound 68 is flowed into the groove between the cell covers it also fills the space between the connector 67 and the bottom of the partition recess.

As a further feature of my invention I provide the arcuate bottom of the partition recess 60 with a groove 70. This groove is also filled with the sealing compound and when used provides for an additional volume of compound in the seal being formed and prevents lateral shifting of the body of compound. The use of this groove also increases the surface area of the top of the partition which is exposed to contact with the sealing compound and hence increases the effectiveness of the seal formed by the compound.

Figure 13:
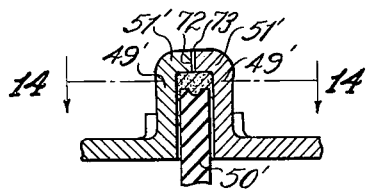
Fig. 13 is a transverse sectional elevation taken through another intercell connection embodying my invention.
Figure 14:
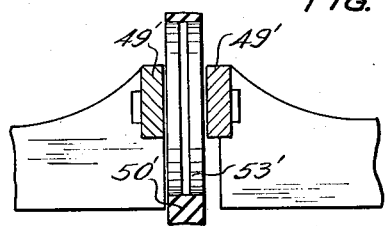
Fig. 14 is a sectional plan view taken on line 14—14 of Fig. 13, but with the sealing material omitted.

In Figs. 13 and 14 I have shown another form of intercell connection which is generally similar to the connection shown in Figs. 9 and 10, but wherein the lateral extensions 51' of the posts 49' have abutting substantially flat end faces 72 which are united by a weld 73 formed therebetween by any suitable welding process or apparatus.

Figure 15:
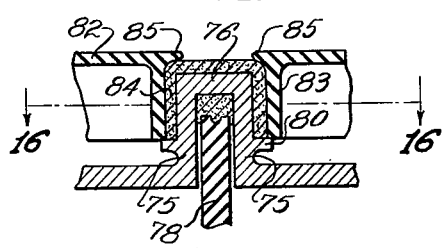
Fig. 15 is a sectional elevation showing another intercell connection embodying my invention.
Figure 16:
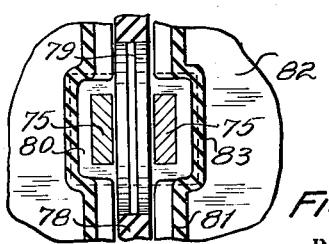
Fig. 16 is a sectional plan view taken on line 16—16 of Fig. 15 and showing the connection before the sealing compound has been applied thereto.

In Figs. 15 and 16 I have shown another form of intercell connection contemplated by my invention, wherein the upper ends of posts 75 are connected by a lead-burned connector 76 which extends across the top of a partition 78 in an arcuate groove 79 thereof. The posts 75 are provided with laterally extending flange-like shoulders 80 which are located at an elevation to be engaged by the lower edges of the depending walls 81 of the cell covers 82. These depending walls 81 of the covers are provided with portions 83 which are recessed or offset away from the partition 78 to form an enlargement of the groove into which the top of the partition 78 extends. The offset portions 83 of the depending cover walls are so formed that when the covers are fitted into the tops of the cell compartments they will be spaced from the posts 75 as shown in Fig. 15. The spacing of these portions of the covers from the posts forms a compound receiving space or groove 84 which extends for a substantial distance around the posts 75 and which is closed at its bottom by a wall formed by the lateral flange-like shoulders 80 of the posts. The adjacent edges of the covers 82 may also be provided with lip or flange-like extension portions 85 similar to the extension portions 44 of Fig. 8.

From the foregoing description and the accompanying drawings it will now be readily seen that I have provided an improved multiple-cell storage battery of the type having concealed or submerged intercell connectors. It will be understood further that this improved battery embodies novel supporting means for the cell covers, and also embodies a novel form of intercell connection providing a seal which is more durable and more satisfactory against leakage of acid.

While I have illustrated and described my invention in a somewhat detailed manner, it should be understood that I do not wish to be limited to the precise details and arrangements disclosed but regard my invention as including such changes and modifications as do not constitute a departure from the spirit of the invention and the scope of the appended claims.

Having thus described my invention I claim:

1. In combination a cell compartment, battery elements in said compartment including a connector lug extending upwardly adjacent a wall of the cell, said lug having a projecting portion providing a lateral shoulder extending around the major portion of the perimeter of the lug, a cell cover having a marginal portion depending in spaced relation to the lug and engaging said shoulder with a portion of the shoulder forming a bottom wall for such space, and sealing compound in said space.

2. In combination a container having compartments and a partition therebetween, upwardly dished cell covers for said compartments providing therebetween a groove into which the upper portion of said partition extends, plate groups in the compartments having posts extending upwardly on opposite sides of the partition and connected by means extending across the partition, said covers having depending walls with portions thereof recessed adjacent said posts to provide an enlargement of said groove, and sealing compound in said groove and enlargement, said covers having extension portions overlying said recessed wall portions.

3. In a storage battery, a container having cell compartments, a partition between the compartments having a recess in the top thereof, battery elements in the compartments including connector lugs extending upwardly on opposite sides of the partition adjacent the recess thereof, covers for said cell compartments providing therebetween a groove into which the top of said partition extends, said covers having depending walls with portions thereof recessed adjacent said lugs to provide an enlargement of said groove, said lugs having projecting portions providing lateral shoulders extending around the major portion of the perimeter of the lugs below the bottom of said recess and which shoulders form a bottom wall for the groove enlargement, and sealing compound in said groove and enlargement and engaging said shoulders, said covers also having extension portions overlying said groove enlargement and engaging the compound therein and of such length that the adjacent top edges of the covers define substantially straight parallel lines.

CARL J. DUNZWEILER.